United States Patent
Miyajima et al.

(10) Patent No.: US 9,669,472 B2
(45) Date of Patent: Jun. 6, 2017

(54) DRILLING APPARATUS AND DRILLING METHOD

(71) Applicant: Fuji Jukogyo Kabushiki Kaisha, Tokyo (JP)

(72) Inventors: Hideaki Miyajima, Tokyo (JP); Takashi Murakami, Tokyo (JP); Hideharu Takahashi, Tokyo (JP); Tatsuo Nakahata, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 165 days.

(21) Appl. No.: 14/285,828

(22) Filed: May 23, 2014

(65) Prior Publication Data

US 2014/0348603 A1    Nov. 27, 2014

(30) Foreign Application Priority Data

May 27, 2013    (JP) ................................. 2013-110549

(51) Int. Cl.
*B23B 47/28*    (2006.01)
*B23B 35/00*    (2006.01)
(Continued)

(52) U.S. Cl.
CPC .............. *B23B 47/28* (2013.01); *B23B 35/00* (2013.01); *B23B 49/02* (2013.01); *B25J 11/005* (2013.01);
(Continued)

(58) Field of Classification Search
CPC ....... Y10T 408/29; B23B 41/14; B23B 49/02; B23B 49/04; B23B 2215/04;
(Continued)

(56) References Cited

U.S. PATENT DOCUMENTS 994,430 A * 6/1911 Tunks ................ B23Q 11/0046
  144/252.1
2,488,992 A * 11/1949 Taylor .................... B23Q 5/265
  173/162.1
(Continued)

FOREIGN PATENT DOCUMENTS

FR    2555083 A1 *    5/1985    ............. B23P 19/00
JP    04082610 A *    3/1992    ............. B23B 39/14
(Continued)

*Primary Examiner* — Sunil K Singh
*Assistant Examiner* — Ryan Rufo
(74) *Attorney, Agent, or Firm* — Smith, Gambrell & Russell, LLP

(57) ABSTRACT

A drilling apparatus includes: a drill rotatable about a center axis and capable of advancing and retracting along the axis; and a pressing unit for pressing a work in an advancing direction of the drill. The drilling apparatus advances the drill while rotating the drill about the center axis to form a hole in the work, in a state in which the work is pressed by the pressing unit. A pressing force applied on the work by the pressing unit is set to a predetermined pressing force based on machining reaction applied to the drill from the work during drilling and the pressing force causing deformation of the work in the advancing direction of the drill. The predetermined pressing force can suppress deformation of the work and displacement of the drill due to the machining reaction. The machining reaction and the pressing force are calculated beforehand in a drilling test.

16 Claims, 4 Drawing Sheets

(51) Int. Cl.
 B23B 49/02 (2006.01)
 B25J 11/00 (2006.01)
 B25J 13/08 (2006.01)
 B23B 49/04 (2006.01)
(52) U.S. Cl.
 CPC ............. B25J 13/085 (2013.01); *B23B 49/04* (2013.01); *B23B 2247/00* (2013.01); *B23B 2260/128* (2013.01); *B23B 2270/06* (2013.01); *B23B 2270/08* (2013.01); *B23B 2270/48* (2013.01); *B23B 2270/483* (2013.01); *B23B 2270/54* (2013.01); *Y10T 408/03* (2015.01); *Y10T 408/29* (2015.01)
(58) Field of Classification Search
 CPC .......... B23B 2226/27; B23B 2226/275; B23B 2247/12; B23B 2270/06; B23B 2270/54; B23B 2270/48; B23B 2270/483; B23Q 3/002
 USPC .......................................... 700/177
 See application file for complete search history.

(56) References Cited

U.S. PATENT DOCUMENTS

| | | | | |
|---|---|---|---|---|
| 2,541,306 A * | 2/1951 | Taylor | ............... | B23B 49/02 173/170 |
| 3,083,593 A * | 4/1963 | Cutter | ............... | B23B 49/02 408/115 R |
| 4,332,066 A * | 6/1982 | Hailey | ............... | B23B 31/08 29/26 R |
| 5,088,171 A * | 2/1992 | Suzuki | ............... | B23B 49/02 29/26 A |
| 5,139,376 A * | 8/1992 | Pumphrey | ............ | B23Q 3/002 408/1 R |
| 5,848,859 A * | 12/1998 | Clark | ............... | B23B 39/14 408/1 R |
| 9,061,419 B2 * | 6/2015 | Kranz | ............... | B25J 9/1633 |
| 2010/0043194 A1 | 2/2010 | Houis et al. | | |
| 2011/0318126 A1 * | 12/2011 | Cornelius | ............ | B23B 39/14 408/1 R |
| 2011/0320031 A1 * | 12/2011 | Cornelius | ............ | B23Q 1/32 700/174 |
| 2013/0017027 A1 | 1/2013 | Miller | | |

FOREIGN PATENT DOCUMENTS

| | | | | |
|---|---|---|---|---|
| JP | H4-082610 | | 3/1992 | |
| JP | H5-029613 | | 4/1993 | |
| JP | 2004-009228 | | 1/2004 | |
| JP | 2004-009228 A | | 1/2004 | |
| JP | 2005-074602 | | 3/2005 | |
| JP | 2008-110438 | | 5/2008 | |
| JP | 2009-184056 A * | | 8/2009 | ............ B23B 47/34 |
| JP | 2010-517866 | | 5/2010 | |
| JP | 2014-073571 | | 4/2014 | |

* cited by examiner

DRILLING APPARATUS AND DRILLING METHOD

CROSS-REFERENCE TO RELATED APPLICATIONS

The present application claims priority from Japanese Patent Application No. 2013-110549 filed on May 27, 2013, the entire contents of which are hereby incorporated by reference.

BACKGROUND

1. Technical Field

The present invention relates to a drilling apparatus and a drilling method.

2. Related Art

There has been known a drilling apparatus that forms a hole in a work with a drill rotated at high speed. In drilling performed using such a drilling apparatus, when holding rigidity of the apparatus is insufficient, the apparatus may slightly displaced because of machining reaction from the work during the drilling, thereby deteriorating machining accuracy of the hole. In particular, in a drilling apparatus used as an end effector of a multi-joint robot in which a plurality of arms is coupled, holding rigidity of the apparatus is low compared with a drilling apparatus mounted on a general drilling machine including a smaller number of movable components. Therefore, deterioration in the machining accuracy may easily occur.

Measures are taken to cope with this problem such as increasing the rigidity of a holding structure of the drilling apparatus, adding control for detecting a displacement of the dill due to machining reaction, and adjusting a feed rate of a drill. However, these measures cause an increase in size and complication of control of an entire working machine including the drilling apparatus. Therefore, there is a demand for a technique for making it possible to suppress the deterioration in the machining accuracy with a simpler configuration.

Therefore, for example, a drilling apparatus described in Japanese Unexamined Patent Application Publication No. 2004-9228 employs a pressing body capable of pressing the periphery of a drilling position of a work. The hole is formed with the drill while the work is pressed with the pressing body, thereby suppressing misalignment between the work and the apparatus.

However, simply pressing the work during drilling may cause deformation of the work due to an excessively large pressing force, and the deterioration in the machining accuracy cannot be reliably prevented. In particular, for example, when an erected tabular work is machined, in a state in which a rear surface (a surface on the opposite side of a surface on a drill advancing side) of the work is not supported, deformation of the work on the rear surface side due to pressing from the surface on the drill advancing side may easily occur.

SUMMARY OF THE INVENTION

The present invention has been devised in view of the problems and it is an object of the present invention to provide a drilling apparatus and a drilling method that can more reliably suppress the deterioration in the machining accuracy of a hole compared with the related art.

In order to attain the object, a first aspect of the present invention provides a drilling apparatus including: a drill rotatable about a center axis and capable of advancing and retracting along the center axis; and a pressing unit for pressing a work in an advancing direction of the drill. The drilling apparatus advances the drill while rotating the drill about the center axis to form a hole in the work, in a state in which the work is pressed by the pressing unit. A pressing force applied on the work by the pressing unit is set to a predetermined pressing force on the basis of machining reaction applied to the drill from the work during drilling and the pressing force causing deformation of the work in the advancing direction of the drill, the predetermined pressing force being capable of suppressing deformation of the work and displacement of the drill due to the machining reaction, the machining reaction and the pressing force being calculated in a drilling test performed in advance.

The drilling apparatus may further include a pressing force detector for detecting a pressing force applied on the work by the pressing unit.

The pressing unit may press the work via a drilling jig that comes into contact with the work in an area larger than the area of a pressing surface of the pressing unit.

The drilling jig may include a positioning hole for positioning a hole formed in the work, and the pressing unit may include a fitting section of which relative position to the drill in a plane orthogonal to the center axis of the drill is fixed and which is capable of fitting in the positioning hole of the drilling jig, the drilling jig being pressed in a state in which the fitting section is fit in the positioning hole.

The drilling apparatus may be an end effector mounted at a distal end of a multi-joint robot.

A second aspect of the present invention provides a drilling method using a drilling apparatus including: a drill rotatable about a center axis and capable of advancing and retracting along the center axis; and a pressing unit for pressing a work in an advancing direction of the drill, to form a hole in the work by advancing the drill while rotating the drill about the center axis in a state in which the work is pressed by the pressing unit, the drilling method including: calculating, in a drilling test performed in advance, pressing reaction applied to the drill from the work during drilling, and a pressing force applied by the pressing unit and causing deformation of the work in the advancing direction of the drill; and setting a predetermined pressing force, on the basis of the calculated machining reaction and the calculated pressing force causing the deformation of the work, the pressing force applied on the work by the pressing unit, the predetermined pressing force being capable of suppressing deformation of the work and displacement of the drill due to the machining reaction.

A drilling apparatus including a pressing force detector for detecting a pressing force applied on the work by the pressing unit may be used as the drilling apparatus.

The pressing unit may press the work via a drilling jig that comes into contact with the work in an area larger than the area of a pressing surface of the pressing unit.

The drilling jig may include a positioning hole for positioning a hole formed in the work, and the pressing unit may include a fitting unit of which relative position to the drill in a plane orthogonal to the center axis of the drill is fixed, the fitting unit being capable of fitting in the positioning hole of the drilling jig, the drilling jig being pressed in a state in which the fitting unit is fit in the positioning hole.

The drilling apparatus may an end effector mounted at a distal end of a multi-joint robot.

DETAILED DESCRIPTION

An implementation of the present invention is described below with reference to the drawings.

Figure 1:
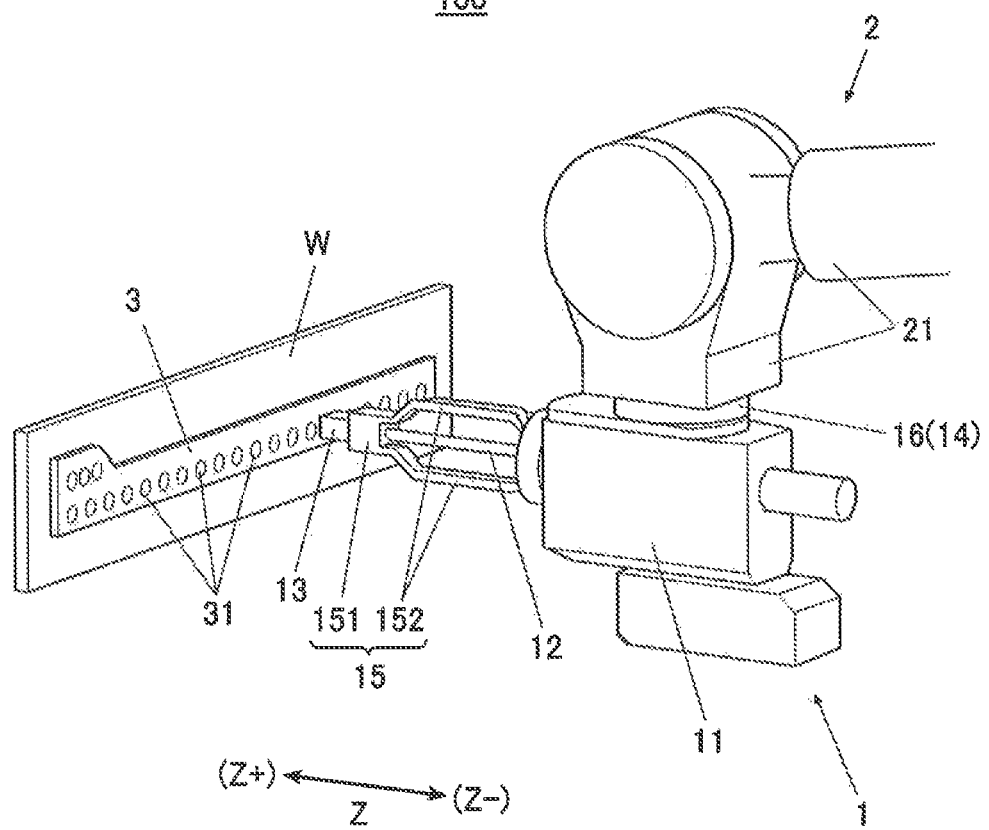
FIG. 1 is a perspective view of a main part of an automatic drill mounted with a drilling apparatus.
Figure 2:
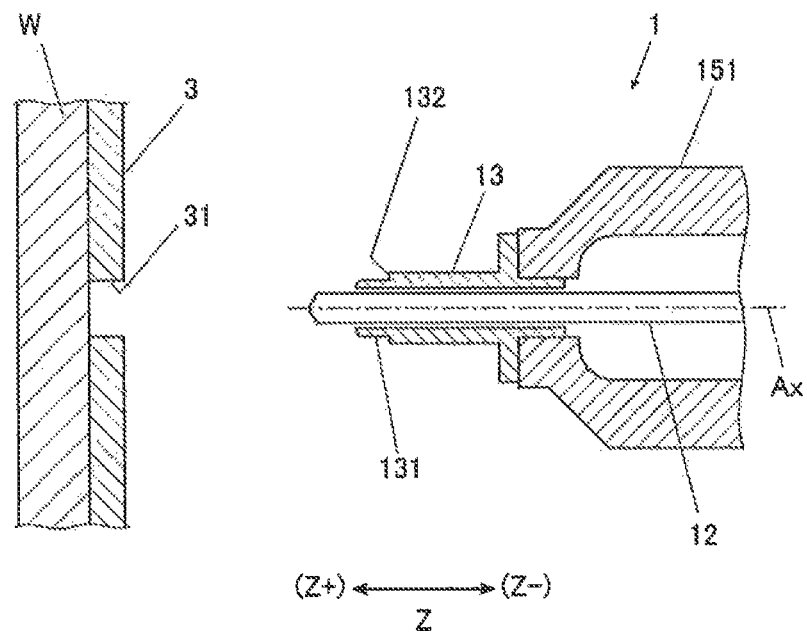
FIG. 2 is a unit al view of a main part of the drilling apparatus.

FIG. 1 is a perspective view of a main part of an automatic drill 100 mounted with a drilling apparatus 1 in this implementation. FIG. 2 is a unit al view of a main part of the drilling apparatus 1.

As illustrated in FIG. 1, in this implementation, the drilling apparatus 1 is an end effector mounted at a distal end of a multi-joint robot 2. The automatic drill 100 that applies drilling to a work W is configured by the drilling apparatus 1 and the multi-joint robot 2.

In the multi-joint robot 2, two each of a plurality of robot arms 21 are turnably coupled to each other. The multi-joint robot 2 can freely adjust a position, an angle, and a posture of the drilling apparatus 1 mounted at the distal end of the multi-joint robot 2. The multi-joint robot 2 is conventionally publicly-known, and thus, detailed description of the configuration of the multi-joint robot 2 is omitted.

In this implementation, the work W to be machined by the drilling apparatus 1 (the automatic drill 100) is a substantially flat carbon composite material erected in the vertical direction. Although not particularly limited, the periphery of the work W is supported by an unillustrated supporting member. A drilling jig 3 for positioning a plurality of holes formed in the work W is attached to the work W. The configuration of the drilling jig 3 is described below.

Specifically, the drilling apparatus 1 includes, as illustrated in FIGS. 1 and 2, a base 11, a drill 12, a pressing member 13, and a pressure sensor 14. The base 11 is fixed to an arm 21 at the most distal end of the multi-joint robot 2 via an attaching unit 16.

The drill 12 includes a cutting edge at the distal end. The drill 12 is supported by the base 11 in a state in which the distal end side is exposed. The drill 12 is coupled to a rotation driver 121 and a feeder 122 (see FIG. 3) housed in the base 11. The drill 12 can be rotated around a center axis Ax thereof and can be advanced and retracted along the center axis Ax by the rotation driver 121 and the feeder 122.

In the following description, the direction in which the drill 12 advances and retracts (a direction along the center axis Ax) is referred to as a drill advancing and retracting direction Z. In the drill advancing and retracting direction Z, a direction in which the drill 12 advances (a direction in which the distal end of the drill 12 moves away from the base 11) is referred to as a drill advancing direction Z+. A direction in which the drill 12 retracts (a direction in which the distal end of the drill 12 approaches the base 11) is referred to as a drill retracting direction Z−.

The pressing member 13 presses the work W during drilling by the drill 12. The pressing member 13 is fixed to the base 11 via a supporting member 15 that supports the pressing member 13. Specifically, the supporting member 15 includes a cylinder 151 surrounding the vicinity of a distal end portion of the drill 12 exposed from the base 11 and two arms 152 and 152 that extend from the base 11 along the drill advancing and retracting direction Z and support the cylinder 151. The pressing member 13 is formed in a cylindrical shape surrounding the vicinity of the distal end portion of the drill 12 and is fixed to a distal end portion of the cylinder 151 of the supporting member 15.

The distal end portion of the pressing member 13 is formed in a stepped shape, the outer diameter of which decreases toward a distal end stepwise. The distal end portion is formed as a cylinder 131, the outer diameter of which is larger than the outer diameter of the drill 12. A stepped surface of the stepped section at the proximal end of the cylinder 131 is formed in a plane shape orthogonal to the drill advancing and retracting direction Z (i.e., the center axis Ax of the drill 12) and is a pressing surface 132 for pressing the work W in the drill advancing direction Z+ via the drilling jig 3.

A relative position of the cylinder 131 at the distal end of the pressing member 13 to the drill 12 in a plane orthogonal the center axis Ax of the drill 12 is fixed such that the outer circumference of the cylinder 131 is substantially concentric with the center axis Ax of the drill 12. The cylinder 131 fits with the drilling jig 3 attached to the work W. The drilling jig 3 fit with the cylinder 131 is a tabular jig including a plurality of positioning holes 31. Both ends of the drilling jig 3 are provisionally fixed to the work W to be disposed in a predetermined position of the work W in a state in which the drilling jig 3 is in contact with a machining surface (a surface into which the drill 12 advances) of the work W in an area (in this implementation, a substantially entire surface) larger than the area of the pressing surface 132 of the pressing member 13. The positioning holes 31 formed in the drilling jig 3 are circular through-holes larger than the holes and formed in a size fitting with the cylinder 131 of the pressing member 13. Therefore, as described below, in a state in which the cylinder 131 of the pressing member 13 is fit in the positioning hole 31 of the drilling jig 3, the drill 12 is advanced into the work W, whereby it is possible to properly determine a position of the work W into which the drill 12 penetrates and a position of a hole formed by the drill 12. The positioning holes 31 are formed deeper than the length of the cylinder 131 of the pressing member 13 (i.e., the drilling jig 3 is formed thicker than the length of the cylinder 131). When the cylinder 131 is fully fit in the positioning hole 31, the pressing surface 132 of the pressing member 13 comes into contact with the drilling jig 3. The outer circumferential surface of the cylinder 131 of the pressing member 13 may be formed in a taper shape to be easily fit in the positioning hole 31 of the drilling jig 3.

The pressure sensor 14 detects a pressing force applied on the work W by the pressing member 13. The pressure sensor 14 is provided in the attaching unit 16 to which the base 11 is fixed. However, a disposing position of the pressure sensor 14 is not particularly limited as long as the pressure sensor 14 can detect a pressing force on the work W along the drill advancing direction Z+ by the pressing member 13.

Figure 3:
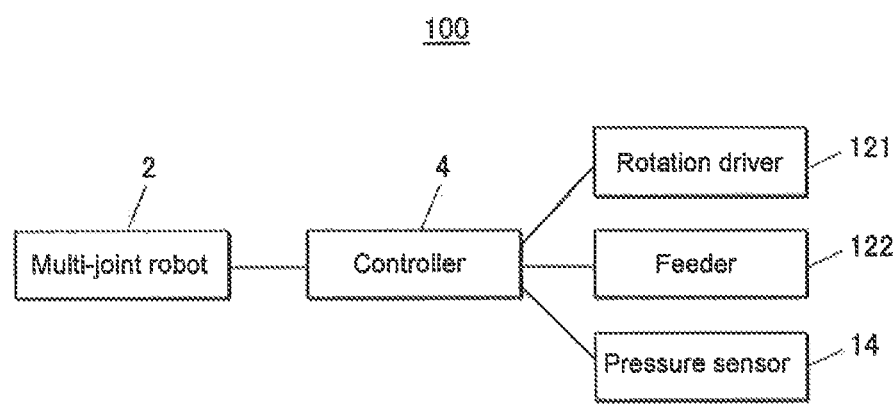
FIG. 3 is a block diagram illustrating a control configuration of the automatic drill.

FIG. 3 is a block diagram illustrating a control configuration of the automatic drill 100.

As illustrated in the figure, the automatic drill 100 includes a controller 4. The controller 4 is electrically connected to the multi-joint robot 2 and controls the operation of the multi-joint robot 2. The controller 4 is electrically connected with the drilling apparatus 1, which is mounted at the distal end of the multi-joint robot 2, via the multi-joint robot 2 and controls the operation of the drilling apparatus 1. Specifically, the controller 4 controls the operations of the rotation driver 121 and the feeder 122, that is, the operation of the drill 12 on the basis of the pressing force on the work W detected by the pressure sensor 14. The control performed by the controller 4 may be based on an operation program stored in advance or may be based on user operation input from a not-shown operation section.

The operation of the automatic drill 100 in forming a hole in the work W is described.

Figure 4A:
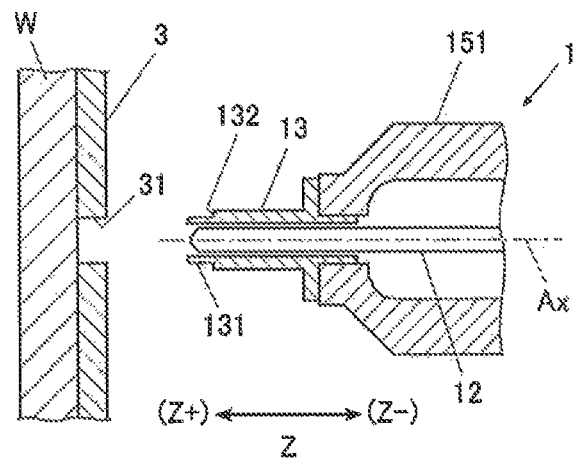
FIGS. 4A to 4C are diagrams describing the operation of the drilling apparatus in forming a hole in a work.
Figure 4B:
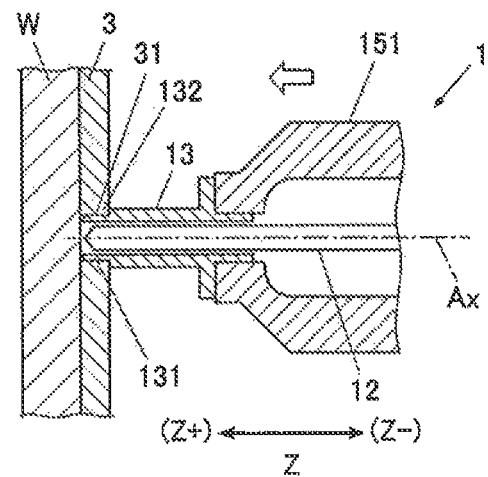
Figure 4C:
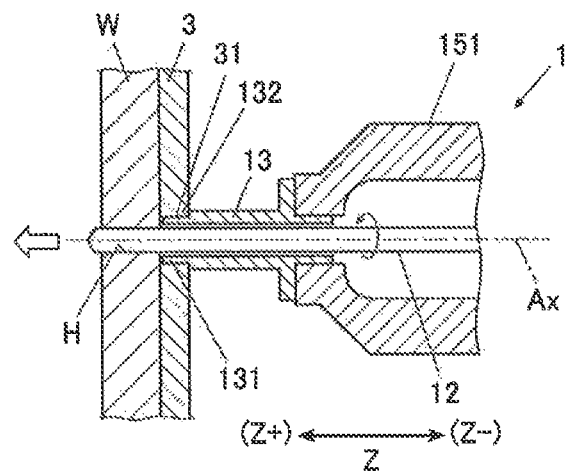

FIGS. 4A to 4C are diagrams for explaining the operation of the automatic drill 100 (in particular, the drilling apparatus 1) in forming a hole in the work W.

For example, when a start command for drilling is input on the basis of user operation, first, the controller 4 controls the operation of the multi-joint robot 2 and, as illustrated in FIG. 4A, moves the drilling apparatus 1 such that the cylinder 131 at the distal end of the pressing member 13 is opposed to the predetermined positioning hole 31 of the drilling jig 3 while the center axis Ax of the drill 12 is orthogonal to the work W. At this point, the controller 4 controls the operation of the feeder 122 and retracts the drill 12 in the drill retracting direction Z− until the distal end of the drill 12 is housed on the inner side of the pressing member 13.

Subsequently, the controller 4 controls the operation of the multi-joint robot 2 and, as illustrated in FIG. 4B, advances the drilling apparatus 1 in the drill advancing direction Z+ to approach the work W and fits the cylinder 131 at the distal end of the pressing member 13 in the positioning hole 31 of the drilling jig 3. Thereafter, the controller 4 further advances the drilling apparatus 1 in the drill advancing direction Z+, brings the pressing surface 132 of the pressing member 13 into contact with the drilling jig 3, and causes the pressing surface 132 to press the work W via the drilling jig 3. The controller 4 sets the automatic drill 100 in a state in which the pressing force on the work W detected by the pressure sensor 14 is a predetermined value, that is, a state in which the work W is pressed with a predetermined pressing force P by the pressing member 13.

Figure 5:
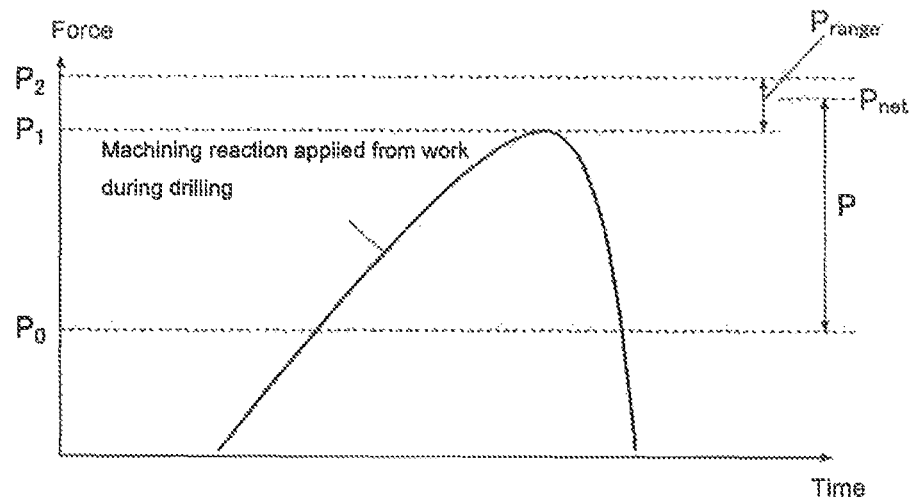
FIG. 5 is a graph describing a pressing force pressing the work during drilling.

The predetermined pressing force P on the work W by the pressing member 13 is set to a value capable of suppressing displacement of the drill 12 due to machining reaction applied to the drill 12 from the work W during the drilling and deformation of the work W in the drill advancing direction Z+ due to the pressing force itself. More specifically, as illustrated in FIG. 5, the predetermined pressing force P is a value that changes to a net position holding force $P_{net}$ capable of suppressing deformation of the work W and displacement of the drill 12 due to the machining reaction by being added to an actual position holding force $P_0$ of the drilling apparatus 1 and the multi-joint robot 2 with respect to a force in the drill retracting direction Z−. The net position holding force $P_{net}$ is a value within a pressing force range $P_{range}$ equal to or larger than a maximum value $P_1$ of machining reaction in the drill retracting direction Z− applied to the drill 12 from the work W during the drilling and smaller than a minimum value $P_2$ of a force in the drill advancing direction Z+ causing deformation of the work W. Therefore, by pressing the work W in the drill advancing direction Z+ with the predetermined pressing force P, it is possible to suppress the displacement of the drill 12 due to the machining reaction applied to the drill 12 from the work W during the drilling and the deformation of the work W in the drill advancing direction Z+ due to the pressing force itself.

The predetermined pressing force P is set on the basis of a result of a drilling test performed in advance prior to actual drilling. In the drilling test, machining reaction applied to the drill 12 from the work W during the drilling and a pressing force causing deformation of the work W in the drill advancing direction Z+ are calculated using the automatic drill 100 and the work W (including the drilling jig 3) same as those used in the actual drilling. That is, the pressing force range $P_{range}$ is calculated in advance by the drilling test. The predetermined pressing force P capable of suppressing the displacement of the drill 12 and the deformation of the work W due to the machining reaction is set on the basis of the calculated pressing force range $P_{range}$. Implementation contents of the drilling test are not particularly limited as long as the pressing force range $P_{range}$ can be calculated. For example, it is also possible to adopt a simple drilling test for repeating trial drilling while varying a pressing force (i.e., a value of the pressure sensor 14) and checking displacement of the drill 12 and deformation of the work W visually or using a clearance gauge or the like every time the trial drilling is repeated.

Subsequently, the controller 4 controls, while keeping a state in which the work W is pressed with the predetermined pressing force P by the pressing member 13, the operations of the rotation driver 121 and the feeder 122 to, as illustrated in FIG. 4C, advance the drill 12 in the drill advancing direction Z+ while rotating the drill 12 about the center axis Ax and forms a hole H in the work W.

Thereafter, the controller 4 controls the operation of the feeder 122 to retract the drill 12 and pulled out the drill 12 from the hole H and, then, repeats the same control to form a plurality of holes H corresponding to the plurality of positioning holes 31 of the drilling jig 3.

As described above, according to this implementation, the machining reaction applied to the drill 12 from the work W during the drilling, and the pressing force applied by the pressing member 13 and causing deformation of the work W in the drill advancing direction Z+ are calculated in the drilling test performed in advance. The pressing force applied on the work W by the pressing member 13 during the drilling is set to, on the basis of the calculated machining reaction and the calculated pressing force causing deformation of the work W, the predetermined pressing force P capable of suppressing deformation of the work W and displacement of the drill 12 due to the machining reaction. Consequently, unlike the related art in which the work is simply pressed during the drilling, it is possible to more surely suppress the deformation of the work W and the displacement of the drill 12 due to the machining reaction and suppress positional deviation between the work W and the drill 12. Therefore, it is possible to more surely suppress deterioration in machining accuracy of the hole H compared with the related art.

The drilling apparatus 1 includes the pressure sensor 14 for detecting a pressing force applied on the work W by the pressing member 13. Therefore, it is possible to accurately manage a pressing force on the work W during the drilling and more surely suppress positional deviation between the work W and the drill 12.

The pressing member 13 presses the work W via the drilling jig 3 that comes into contact with the work W in an area larger than the area of the pressing surface 132 of the pressing member 13. Therefore, compared with the pressing member 13 directly pressing the work W, it is possible to more equally disperse the pressing force to a larger area of the work W and suitably suppress the machining reaction.

The drilling jig 3 includes the positioning hole 31 for positioning the hole H formed in the work W. The pressing member 13 includes the cylinder 131 of which relative position to the drill 12 in the plane orthogonal to the center axis Ax of the drill 12 is fixed and which is capable of fitting in the positioning hole 31 of the drilling jig 3, and the drilling jig 3 is pressed in a state in which the cylinder 131 is fit in the positioning hole 31. Consequently, it is possible to properly determine a position of the work W into which the drill 12 penetrates and a position of the hole H formed by the drill 12.

Implementations applicable with the present invention are not limited to the implementation described above and can be changed as appropriate without departing from the gist of the present invention.

Figure 6:
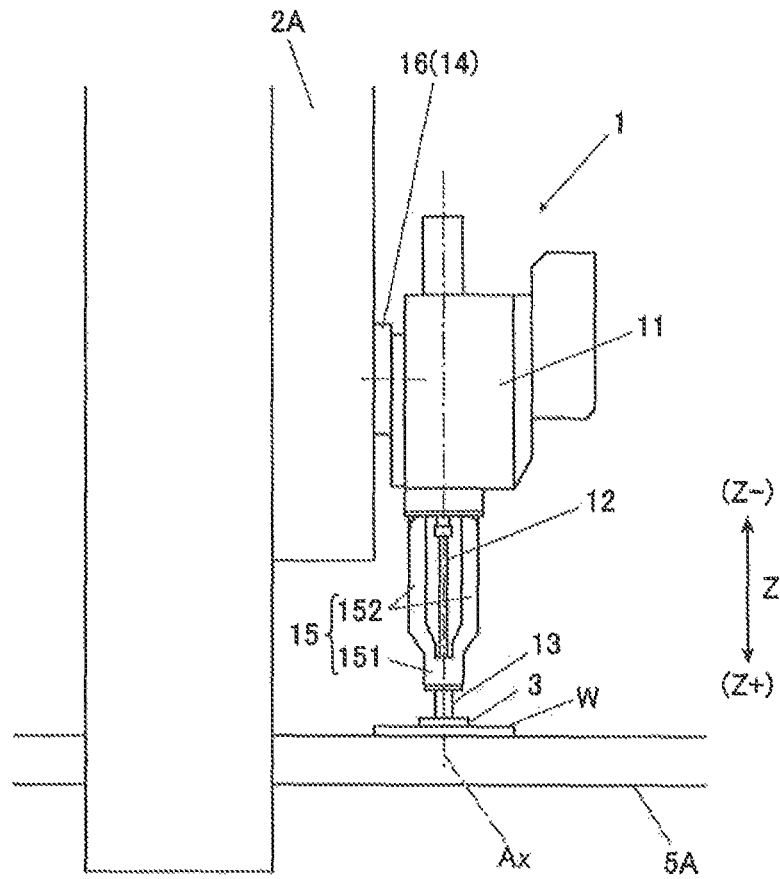
FIG. 6 is a side view illustrating a drilling apparatus mounted on a gate-type movable rail.

For example, in the implementation, the drilling apparatus mounted at the distal end of the multi-joint robot 2 is described as the drilling apparatus 1. However, the drilling apparatus 1 is not limited to the drilling apparatus mounted on the multi-joint robot 2. For example, as illustrated in FIG. 6, the drilling apparatus 1 may be a drilling apparatus that is mounted on a gate-type movable rail 2A and applies drilling to the work W on a table 5A.

The work W is not limited to the carbon composite material and may be metal such as aluminum.

The invention claimed is:

1. A drilling apparatus comprising:
   a drill rotatable about a center axis and capable of advancing and retracting along the center axis;
   a pressing unit for pressing a work in an advancing direction of the drill; and
   a controller configured to:
      advance the drill while rotating the drill about the center axis to form a hole in the work, in a state in which the work is pressed by the pressing unit,
      store a machining reaction force applied to the drill from the work during drilling and a deforming force that will deform the work in the advancing direction of the drill, the machining reaction force and the deforming force calculated in a drilling test performed in advance,
      set a predetermined pressing force applied on the work by the pressing unit to be equal to or greater than the machining reaction force while also being less than the deformation force, such that the predetermined pressing force is set as a force that will suppress displacement of the drill and suppress deformation of the work, and
      control the pressing unit to press the work via a drilling jig that comes into contact with the work in an area larger than the area of a pressing surface of the pressing unit.

2. The drilling apparatus according to claim 1, further comprising a pressing force detector for detecting a pressing force applied on the work by the pressing unit.

3. The drilling apparatus according to claim 1, wherein
   the drilling jig includes a positioning hole for positioning a hole formed in the work, and
   the pressing unit includes a fitting unit of which relative position to the drill in a plane orthogonal to the center axis of the drill is fixed and which is capable of fitting in the positioning hole of the drilling jig, the drilling jig being pressed in a state in which the fitting unit is fit in the positioning hole.

4. The drilling apparatus according to claim 2, wherein
   the drilling jig includes a positioning hole for positioning a hole formed in the work, and
   the pressing unit includes a fitting unit of which relative position to the drill in a plane orthogonal to the center axis of the drill is fixed and which is capable of fitting in the positioning hole of the drilling jig, the drilling jig being pressed in a state in which the fitting unit is fit in the positioning hole.

5. The drilling apparatus according to claim 1, wherein the drilling apparatus is an end effector mounted at a distal end of a multi joint robot.

6. The drilling apparatus according to claim 2, wherein the drilling apparatus is an end effector mounted at a distal end of a multi joint robot.

7. The drilling apparatus according to claim 3, wherein the drilling apparatus is an end effector mounted at a distal end of a multi joint robot.

8. The drilling apparatus according to claim 4, wherein the drilling apparatus is an end effector mounted at a distal end of a multi joint robot.

9. A drilling method comprising:
   utilizing the drilling apparatus according to claim 1;
   determining, based on testing performed in advance, the machining reaction force and the deforming force;
   setting the predetermined pressing force; and
   pressing the work with the pressing unit via the drilling jig.

10. The drilling method according to claim 9, wherein the drilling apparatus includes a pressing force detector for detecting a pressing force applied on the work by the pressing unit.

11. The drilling method according to claim 9, wherein
   the drilling jig includes a positioning hole for positioning a hole formed in the work, and
   the pressing unit includes a fitting unit of which relative position to the drill in a plane orthogonal to the center axis of the drill is fixed, the fitting unit being capable of fitting in the positioning hole of the drilling jig, the drilling jig being pressed in a state in which the fitting unit is fit in the positioning hole.

12. The drilling method according to claim 10, wherein
   the drilling jig includes a positioning hole for positioning a hole formed in the work, and
   the pressing unit includes a fitting unit of which relative position to the drill in a plane orthogonal to the center axis of the drill is fixed, the fitting unit being capable of fitting in the positioning hole of the drilling jig, the drilling jig being pressed in a state in which the fitting unit is fit in the positioning hole.

13. The drilling method according to claim 9, wherein the drilling apparatus is an end effector mounted at a distal end of a multi-joint robot.

14. The drilling method according to claim 10, wherein the drilling apparatus is an end effector mounted at a distal end of a multi joint robot.

15. The drilling method according to claim 11, wherein the drilling apparatus is an end effector mounted at a distal end of a multi-joint robot.

16. The drilling method according to claim 12, wherein the drilling apparatus is an end effector mounted at a distal end of a multi joint robot.

* * * * *